March 18, 1969    F. S. STEIN    3,433,676
THERMOPHOTOVOLTAIC ENERGY CONVERTOR WITH PHOTOCELL MOUNT
Filed Oct. 21, 1964    Sheet 1 of 2
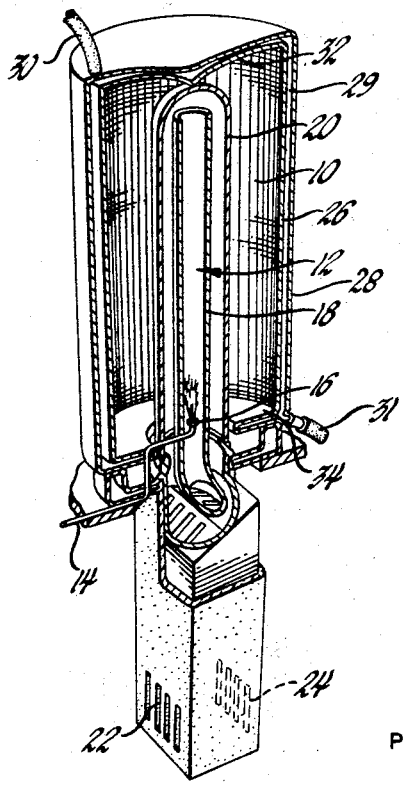
Fig.1
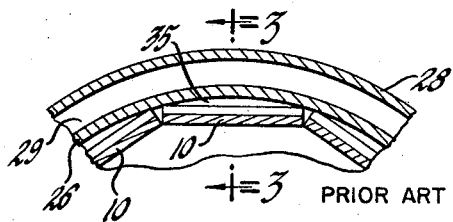
PRIOR ART
Fig.2
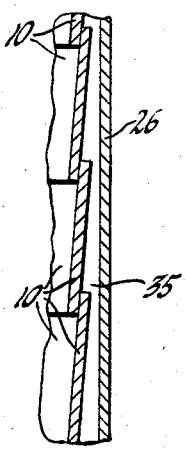
PRIOR ART Fig.3
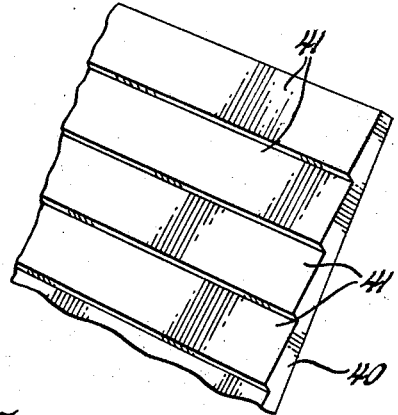
Fig.4
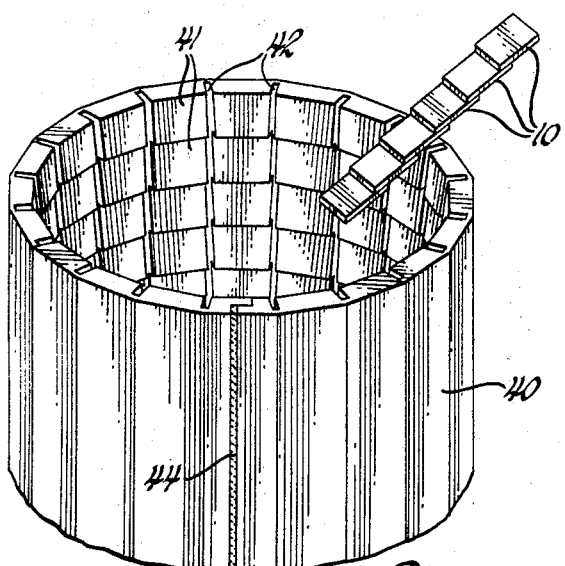
Fig.6
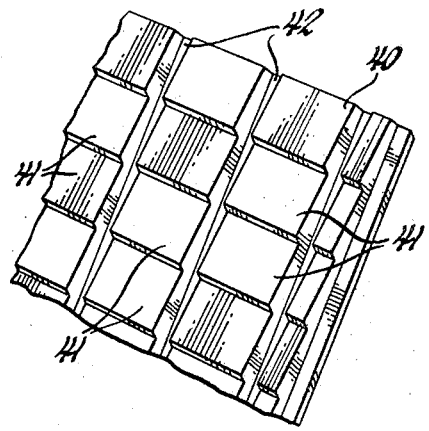
Fig.5
INVENTOR.
Frank S. Stein
BY
Hugh L. Fisher
ATTORNEY

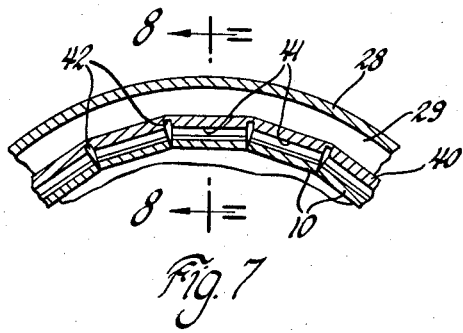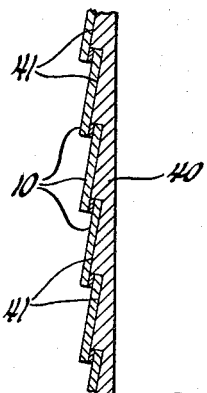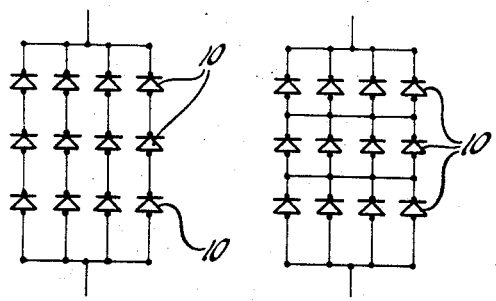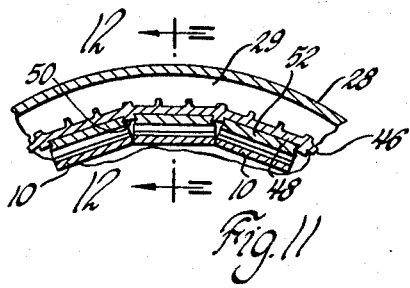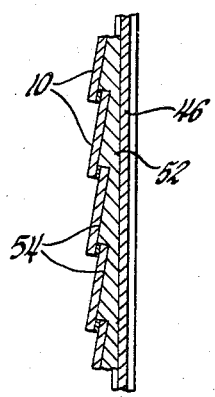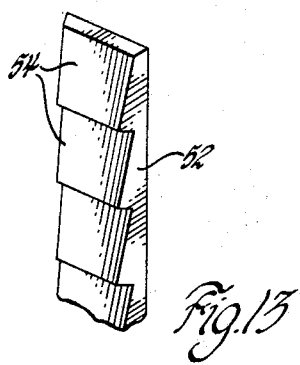
INVENTOR.
Frank S. Stein

United States Patent Office 3,433,676
Patented Mar. 18, 1969

3,433,676
THERMOPHOTOVOLTAIC ENERGY CONVERTOR WITH PHOTOCELL MOUNT
Frank S. Stein, Kokomo, Ind., assignor to General Motors Corporation, Detroit, Mich., a corporation of Delaware
Filed Oct. 21, 1964, Ser. No. 405,365
U.S. Cl. 136—89      3 Claims
Int. Cl. H01m 3/04, 15/00

---

ABSTRACT OF THE DISCLOSURE

Mounting structure for flat cells in radiant energy convertors including a hollow polygonal mounting member having parallel rows of flat steps for receiving the cells in facial contact therewith through an insulative adhesive. Flat steps may be formed on member or on inserts held by member.

---

This invention relates to thermophotovoltaic (TPV) energy convertors and, more particularly, to improved mounting means for the photovoltaic cells which are used in such convertors.

As is well known to those skilled in the art, a thermophotovoltaic convertor is a device for converting heat into electricity. In accordance with the general concept of thermophotovoltaic energy conversion, an emitting surface may be heated to incandescence by a suitable heat source and the photons which are produced thereby are concentrated on a plurality of photovoltaic devices which are uniformly arranged about and spaced from the emitting surface to produce electricity. A thermophotovoltaic convertor of this type is described in the copending application United States Ser. No. 298,919, filed July 31, 1963, now Patent No. 3,331,707, in the name of John J. Werth, and assigned to General Motors Corporation.

In the thermophotovoltaic convertor, as in substantially all energy conversion devices, high efficiency is an extremely desirable quality. It has been found that the light to electricity conversion capacity of the solid state photovoltaic cell is greatly influenced by the temperature at which the cell is required to operate. In general, the higher the operating temperature of the cells, the lower the efficiency of the conversion; therefore, it is desirable to conduct heat away from the cell as rapidly as possible. Since the mounting structure upon which the photovoltaic cells are disposed serves as the heat sink for the heat energy which is produced in and absorbed by the cell, it is desirable to provide an excellent thermal contact from the cell to the mounting structure. However, due to the preferably circular or cylindrical geometry of the mounting structure and the planar nature of the cells, the preferred "shingled" cell pattern produces appreciable spaces between the cells and the mounting structure. These open spaces provide very poor thermal contact and thus adversely affect the efficiency of the conversion process. The spaces may be filled by pouring molten metal into them; however, this alternative is unsatisfactory because of the deleterious effect the molten metal has on the cell arrays when heated and poured into place. Other filler materials which may be used without heat are unsatisfactory because of their low thermal conductivity.

In accordance with the present invention, excellent thermal contact and conductance is provided between the cells and the mounting structure, thereby reducing the operating temperature of the cells and giving rise to increased efficiency in the conversion process. In general, this is accomplished through the provision of a novel mounting structure for the photovoltaic cells which are used in the energy conversion apparatus. According to the invention, the mounting structure includes at least one mounting surface which is disposed facing a source of radiant energy and has formed thereon a plurality of parallel steps. The photovoltaic cells may then be disposed on the steps in the preferred "shingled" arrangement, which is to say that the cells are disposed in series-overlapping relation. The cells may be electrically insulated from the mounting means by one of several convenient means.

In a preferred form the subject mounting means may take the form of a continuous hollow polygonal structure made of a material exhibiting a good thermal conductivity such as aluminum. The inner wall of the mounting structure is formed to define a plurality of axially parallel mounting surfaces, each of which exhibits a multistepped axial profile having a plurality of parallel steps upon which the cells may be uniformly disposed in series overlapping relation; that is, in the well-known "shingled" arrangement.

Further features and advantages of the present invention will be better understood from a reading of the following specification which describes alternative embodiments of the invention and is to be taken with the accompanying drawings in which:

FIGURE 1 is a partly sectioned view of an illustrative embodiment of a TPV convertor which may advantageously employ the present invention.

FIGURE 2 is a cross-sectional view of a prior art mounting structure showing a plurality of cells mounted thereon;

FIGURE 3 is an axial sectional view of the prior art mounting structure taken along a line 3—3 of FIGURE 2;

FIGURE 4 is an illustration of a partially machined piece of stock from which the present mounting structure may be fabricated;

FIGURE 5 is a partial view of the present mounting structure prior to shaping for installation;

FIGURE 6 is a partial view of an illustrative embodiment of the present mounting structure;

FIGURE 7 is a top sectional view of the illustrative embodiment of the present invention indicating the disposition of the plurality of photovoltaic cells thereon;

FIGURE 8 is a sectional view of the proposed mounting structure taken along the lines 8—8 of FIGURE 7;

FIGURE 9 is an illustrative electrical wiring arrangement for the proposed TPV convertor;

FIGURE 10 is an illustrative wiring diagram for the proposed TPV convertor;

FIGURE 11 is a top sectional view of an additional illustrative embodiment of the present invention;

FIGURE 12 is a sectional view of the embodiment of FIGURE 11 taken along a line 12—12; and FIGURE 13 is a partial view of a portion of the illustrative embodiment shown in FIGURES 11 and 12.

Referring now to FIGURE 1, there is represented an illustrative TPV convertor with which the present invention may be advantageously associated. Describing this convertor in detail, a plurality of photovoltaic cells 10 are arranged in a substantially cylindrical array about and spaced from an elongated cylindrical combustion chamber 12. The combustion chamber 12 is provided with a fuel input line 14 which terminates at the lower portion of the chamber 12 with a cermet nozzle 16. The combustion chamber 12 further includes an inner guard member 18 and an outer member 20 having an emissive surface which is of substantially cylindrical configuration. As is apparent, the combustion chamber 12 including members 18 and 20 serves as a source for emitting radiant energy to the photovoltaic cells 10 upon combustion of the fuel which enters the chamber 12 via line 14.

The products of combustion may be exited from the combustion chamber by way of a path running between the inner and outer members 18 and 20 and communicating with an exhaust port 22. Air may be introduced into the chamber by way of a path beginning at 24 as indicated. For cooling purposes the cylindrical mounting structure for the photovoltaic cells 10 is so formed as to have an inner wall 26 and an outer wall 28 which are radially spaced to provide a water jacket 29 having an inlet 30 and an outlet 31 as shown.

To ensure uniform irradiation of the photovoltaic cells 10, the upper and lower end walls of the mounting structure may be provided with reflective interior surfaces 32 and 34 respectively which are highly efficient radiant energy reflectors. The lower surface 34 may be essentially flat as shown. However, to ensure the proper reflection characteristics of the energy from the combustion chamber 12, the upper surface 32 may be somewhat dish-shaped with the cross section of the surface taking the form of two curves which converge at the center.

The operation of the convertor shown in FIGURE 1 is briefly described in the following. Fuel is introduced into the combustion chamber by means of the line 14 where it is mixed with air entering through passage 24 for combustion in chamber 12. Surface 20 is soon heated to incandescence and emits radiant energy which is radiated outwardly to the cylindrical arrangement of photovoltaic cells 10. The cells operate to convert the radiant energy into electricity which is collected by suitable means for use in an external device.

According to the prior art which is illustrated in FIGURES 2 and 3, the photovoltaic cells 10, which are generally flat and rectangular in shape, are bonded to the inner surface of the wall 26 by means of an insulative adhesive. As can be seen in FIGURE 2, the circular contour of the cylindrical mounting wall 26 leaves objectionable open spaces 35 between the back of the cells 10 and the inner surface of wall 26. These spaces, which may be on the order of 0.01 inch, provide a poor heat conduction path, and a relatively large temperature drop occurs across this space which seriously impairs the conversion efficiency of the cells 10.

Looking to FIGURE 3, the cells 10 are shown arranged in the well-known and preferred shingle fashion which involves a series overlapping relationship between the cells. This relationship effectively connects the cells 10 in series-connected columns. In this instance, the straight axial side of the mounting member 26 produces relatively wide gaps or spaces 38 which again give rise to a large temperature drop.

To rectify the conversion efficiency degradation which is caused by the presence of the spaces 35 and 38 in the prior art mounting arrangements, the present invention proposes the use of a mounting structure 40, shown in FIGURE 4 in a partially completed state, in which the cell-mounting surface which faces the source of radiant energy defined with respect to FIGURE 1 includes a plurality of parallel flats or steps 41 which may be milled on the inner surface of the mounting structure 40. The mounting structure 40 may be made of aluminum which is known to possess the proper thermal conductivity characteristics. In addition, aluminum may be anodized to simply and effectively electrically insulate the mounting structure 40 from the cells 10. As is apparent, the structure 40, in a completed state, is substituted for the straight wall 26 shown as prior art.

Looking to FIGURES 5 and 6, after milling the multi-stepped profile including steps 41 on the mounting structure 40, a plurality of parallel and axially disposed grooves 42 may be milled into the structure 40 at regular intervals which are spaced a distance apart slightly in excess of the width of the photovoltaic cells 10 to be used. Following this step, the mounting structure 40 may be conveniently shaped into a continuous polygonal mounting structure as shown in FIGURE 6 in which the two ends of the structure 40 are welded or otherwise bonded together at a seam 44. The structure 40 is bent into the polygonal configuration at the location of the grooves 42 such that there is provided a plurality of axially disposed mounting surfaces each of which includes the plurality of parallel steps 41. As shown in FIGURES 7 and 8, this multi-stepped profile configuration permits the disposition of the cells 10 on the axial mounting surfaces in the preferred shingled fashion. However, as distinguished from the prior art, the cells 10 are disposed flush with the mounting surfaces, thus eliminating the objectionable spaces 35 and 38 which are shown to exist in the configuration of FIGURES 2 and 3.

According to the shingled cell disposition as shown in FIGURE 8, each of the cells 10 is part of a series-connected column corresponding to the stepped mounting surfaces as described above. These columns may be connected alternately in series, or in parallel as shown in FIGURE 9. In order to prevent single cell failures from affecting whole rows of cells, it may be desirable to connect a number of adjacent columns of shingled cells in parallel with each other not only at the upper and lower ends of the shingled columns, but also redundantly at intermediate points as shown in FIGURE 10. This may be effected through proper design of the metallic electrodes on the surfaces of the cells 10. The current-carrying wires which may be necessary for connecting adjacent columns of cells in series may be conveniently disposed in the grooves 42 shown in FIGURES 5 through 7. This disposition prevents shadowing or shielding of any portion of the cells 10 by the current-carrying wires from the radiating surface 20. Thus, the grooves 42 serve a dual purpose, that of locating the bending lines for the formation of the polygonal structure shown in FIGURE 6, and further for the location of the current-carrying wires for connecting adjacent columns of cells in series.

Referring now to FIGURES 11, 12 and 13, an alternative mounting arrangement is described. FIGURE 11 shows a polygonal mounting structure 46 having a plurality of flat axially extending surface portions 48 separated by radial fingers 50. As shown in FIGURE 13, an insert member 52 having tapered sides and a multistepped profile may be slid into position between two of the adjacent fingers 50 to be maintained in close contact with the mounting structure 46. As shown in FIGURES 12 and 13, each of the insert members 52 is provided with a mounting surface including a plurality of parallel steps 54 upon which cells 10 may be mounted in the shingled or series-overlapping relation. According to this modular structure, the cells 10 may be initially mounted on the insert members 52 and tested for defective interconnection before being slid into position on the structure 46. Further, the insertable units of FIGURE 12 may be inserted in alternate senses; that is, with every other one upside down, thus facilitating the series connection of adjacent columns of cells. With this method, the need for axial current-carrying wires is obviated. Furthermore, any single cell failure which might occur during operation may be corrected by simple removal of the faulty insert member 52 and replacement with a new column of cells on a new insert member 52. Structure 46 may be readily fabricated by an extrusion process, for example. Fins can be added optionally, with no expense, to enhance water cooling.

While this invention has been described with respect to specific embodiments, it is to be understood that the above description is not to be construed in a limiting sense. Further modifications and additions to this invention will undoubtedly be apparent to those skilled in the art, and for a definition of the invention, reference should be had to the appended claims.

I claim:
1. In combination with energy conversion apparatus including a source of radiant energy and a plurality of substantially flat photovoltaic cells having parallel front and rear surfaces, said cells being spaced from the source and responsive to radiant energy to produce electrical energy: a hollow, continuous polygonal, thermally conductive mounting structure having an axis of symmetry and being disposed about and spaced from said source, the inner wall of the mounting structure having formed therein a plurality of parallel, axial grooves defining mounting surfaces mediate said grooves, each of the surfaces being disposed facing the source and having a continuous axial profile of substantially flat parallel steps, the cells being uniformly disposed on each of the stepped surfaces, one cell on each step with the rear surface of each cell in juxtaposition to substantially the entire step surface and overlapping the front surface of the adjacent cell and bonded to the steps with electrically insulative adhesive.

2. Apparatus as defined in claim 1 including conductor means electrically connecting the rows of cells and being disposed in the grooves.

3. In combination with energy conversion apparatus including a source of radiant energy and a plurality of substantially flat photovoltaic cells having parallel front and rear surfaces, said cells being spaced from the source and responsive to radiant energy to produce electrical energy: mounting means for the cells including a hollow thermally conductive polygonal member having an axis of symmetry and being disposed about and spaced from the source, the inner wall of the polygonal member defining a plurality of flat axially parallel surfaces facing the source, a plurality of thermally conductive insert members each having a flat back surface and a continuous axial profile of flat parallel steps on the front surface, the rear surfaces of the cells being insulatively bonded to the steps of each of the insert members, one cell on each step with the rear surface of each cell in overlapping contact with the front surface of the next, and means for mounting the insert members on the polygonal member with the back surfaces in substantially full contact with said axially parallel surfaces.

References Cited

UNITED STATES PATENTS

| | | | |
|---|---|---|---|
| 2,034,334 | 3/1936 | Falkenthal | 136—89 |
| 2,428,537 | 10/1947 | Veszi et al. | 136—89 |
| 2,625,930 | 1/1953 | Harris | 136—89 |
| 2,983,887 | 5/1961 | Wormser | 136—89 |
| 2,989,575 | 6/1961 | Wallace | 136—89 |
| 3,005,862 | 10/1961 | Escoffery | 136—89 |
| 3,116,171 | 12/1963 | Nielson et al. | 136—89 |
| 3,232,795 | 2/1966 | Gillette et al. | 136—89 |
| 3,268,366 | 8/1966 | Guyot | 136—89 |

FOREIGN PATENTS 655,927   1/1938   Germany.

OTHER REFERENCES

Wedlock, Proc. I.E.E.E., vol. 52, May 1963, pp. 694–8.

Werth, Proc. 17th Ann. Power Sources Conf., New Jersey, October 1963, pp. 23–7.

White et al.: Proc. 15th Ann. Power Sources Conf., New Jersey, October 1961, pp. 125–32.

ALLEN B. CURTIS, *Primary Examiner.*